United States Patent [19]
Nordstrom et al.

[11] Patent Number: 6,073,253
[45] Date of Patent: Jun. 6, 2000

[54] ENHANCED RESET AND BUILT-IN SELF-TEST MECHANISMS FOR SINGLE FUNCTION AND MULTIFUNCTION INPUT/OUTPUT DEVICES

[75] Inventors: Gregory Michael Nordstrom, Oronoco; Shawn Michael Lambeth, Pine Island; Paul Edward Movall, Rochester; Daniel Frank Moertl, Rochester; Charles Scott Graham, Rochester; Paul John Johnsen, Rochester; Thomas Rembert Sand, Rochester, all of Minn.

[73] Assignee: International Business Machines Corporation, Armonk, N.Y.

[21] Appl. No.: 08/995,075

[22] Filed: Dec. 19, 1997

[51] Int. Cl.<sup>7</sup> ................................................ G06F 11/00
[52] U.S. Cl. ................................ 714/25; 714/27; 714/43
[58] Field of Search ............................... 714/720, 25, 27, 714/30, 36, 43

[56] References Cited

U.S. PATENT DOCUMENTS

| | | | |
|---|---|---|---|
| 5,748,640 | 5/1998 | Jiang et al. | 714/720 |
| 5,878,237 | 3/1999 | Olarig | 710/128 |

OTHER PUBLICATIONS

IBM Technical Disclosure Bulletin, vol. 39, No. 01, Jan. 1996, entitled "Method for Atomic Peer Communication on a Peripheral Component Interconnect Bus" by B. E. Bakke et al.

IBM Patent Application (Docket RO997–066) entitled "Dynamic Configuration System, Apparatus and Method for Dynamically Configuring I/O Device Adapters" filed Dec. 19, 1997 (SN 08/995,157).

*Primary Examiner*—Ly V. Hua
*Attorney, Agent, or Firm*—Karuna Ojanen

[57] ABSTRACT

An apparatus, system and method permitting a variety of reset procedures and corresponding reset states. A device reset control register is provided for each I/O device adapter in single function or multifunction devices. The device reset control registers permit a greater degree of control over single function devices, multifunction device as a whole and individual device functions within a multifunction device. A device immediate status register synchronizes the various reset procedures. A logical power on reset procedure, a directed unit reset procedure and a directed interface reset procedure utilize the greater degree of control that the device reset control registers provide to force the I/O device adapter, single function device or multifunction device into a corresponding logical power on reset state, a directed unit reset state or a directed interface reset state. Each of these reset states is well-defined and has the advantage of predictable behavior during and after execution of the corresponding reset procedure. A built-in self-test procedure is also defined that sequentially examines each function associated within a multifunction device connected to the local bus to coordinate the initiation, execution and completion of built in self-tests.

38 Claims, 17 Drawing Sheets

BIST Control/Status Register 440

| BIST Capable 442 | Start BIST 444 | | Global Completion Status 446 | Function Completion Status 448 |

FIGURE 4C

Device Immediate Status Register
450

| Status Acknowledge |
|---|

FIGURE 4D

ENHANCED RESET AND BUILT-IN SELF-TEST MECHANISMS FOR SINGLE FUNCTION AND MULTIFUNCTION INPUT/OUTPUT DEVICES

CROSS-REFERENCE TO RELATED APPLICATION

The present invention is related to U.S. patent application Ser. No. 08/995,157, System for Dynamically Configuring I/O Device Adapters Where a Function Configuration Register Contains Ready/Not Ready Flags Corresponding to Each I/O Device Adapter, which is hereby incorporated by reference.

BACKGROUND OF THE INVENTION

1. Technical Field of the Invention

This invention is related to methods, devices and systems for enhancing reset and built-in self-test mechanisms for input/output (I/O) device adapters. Specifically, the invention includes enhanced I/O device resets that bring the I/O device adapter and the I/O device connected thereto into one of several defined reset states thereby permitting a greater degree of control over I/O devices, adapters, and their components and bringing these elements into a well-defined, predictable state. This invention has particular application to I/O device adapters and systems conforming to the PCI (peripheral component interconnect) local bus specification.

2. Description of Related Art

The PCI local bus is an industry standard I/O bus that interconnects computer processor complexes to I/O device adapters. The computer processor complex typically contains a central processing unit (CPU) and system main storage facilities. A PCI I/O device adapter contains hardware, and possibly additional processors, memory and programming to interconnect I/O devices such as disks, computer network interfaces, and so forth, to the processor complex and to control the functions of these I/O devices.

The PCI local bus specification was developed and is controlled by a special interest group of I/O device and computer system vendors influential in the personal computer and PC server industry. This specification is defined expressly as a higher performance replacement for the existing standard I/O bus architectures such as the IBM microchannel and extended industry standard architecture. As such, the PCI local bus specification is the dominant I/O bus architecture within a very large segment of the computer industry. Furthermore, the PCI local bus specification has been embraced outside of this segment by vendors that participate primarily in other markets, such as enterprise-class network server and mainframe computers. Thus, the scope of computer system and I/O device products that employ PCI local bus implementations is rapidly becoming the majority within the overall computer industry.

FIGS. 1 and 2 illustrate the basic elements of a conventional PCI local bus implementation including a processor complex 100 having a central processing unit (CPU) 110 and memory 120 interconnected by a processor memory bus 130. The conventional PCI local bus implementation further includes a PCI backplane 200 that is typically a motherboard with a PCI local bus 230, and PCI connectors 205, 206 that interconnect PCI I/O device adapters to the PCI local bus 230.

PCI connectors 205, 206 are mounted to slots on the PCI local bus 230 and may either be a removable-type connector 205 or an embedded, nonremovable connector 206. The PCI connector 205 interconnects the PCI local bus 230 and PCI device 240. The implementation shown in FIGS. 1 and 2 illustrates a removable PCI device 240 that may be easily disconnected from the local bus 230 via a PCI connector 205. The PCI connectors 205 also interconnect the PCI local bus 230 and a PCI multifunction device 260 as shown in FIG. 2.

FIG. 1 is particularly directed to a system of single function devices connected to a PCI local bus including a removable PCI device 240 having a single function I/O adapter 250 connected therein and two I/O device adapters 252, 254 connected directly to a slot in the PCI local bus 230. PCI device 240 includes an I/O device adapter 250 that behaves as a singular unit on the PCI local bus 230 with respect to its interconnections to PCI local bus 230 and participation in PCI bus signaling protocols. Thus, PCI device 240 and the I/O device adapter 250 are typically referred to as a "single function" PCI device.

FIG. 2 is particularly directed to a system of PCI single function and multifunction devices. The PCI single function device includes a removable PCI device 240 having a single function PCI I/O adapter 250 connected therein. The PCI multifunction device 260 includes a plurality of I/O device adapters 252,254, hence the term "multifunction" device.

Although the same I/O device adapter 250 may be utilized within the PCI multifunction device 260 as the single function device 240, reference numerals 252 and 254 are utilized for the I/O device adapters within the multifunction device 260 to indicate optional structure and functionality such as the addition of a processor and memory to implement an I/O processor, or to indicate that the I/O device adapter 252,254 may be unique with respect to the type of I/O device attached thereto.

A function router 270 is included within the PCI multifunction device 260 to interconnect the I/O device adapters 252,254 to the PCI local bus 230. Typically, the function router 270 may be implemented with a multiplexer such that data and/or control signals may be routed between the processor complex 100 and the selected I/O device adapter 252 or 254. The processor complex 100 may individually address the single function PCI device 240 or the PCI multifunction device 260 using a unique device identifier assigned to each PCI local bus connection in which a PCI device 240, 260 can be attached. In other words, a unique device identifier is assigned to each slot in which the PCI connector 205 is inserted. This device identifier is the IDSEL, defined by the PCI local bus specification, utilized to uniquely select a desired I/O device on the PCI local bus 230 during PCI configuration read or configuration write signaling protocols.

The configuration protocol defined within the PCI local bus specification allows the processor complex 100 to individually address each PCI local bus device 250, 260 using a physical selection signal that is part of the PCI bus signal definitions. The specification further assigns to each I/O device adapter 250, 252, 254 a range of processor memory addresses by which the CPU 110 may subsequently communicate with the I/O device adapters 250, 252, 254.

The PCI multifunction device 260 serves to collect multiple PCI I/O device adapters 252,254 using a single PCI local bus connection. This arrangement is quite practical in that it allows for the evolution from larger physical components to more dense physical integration as components become smaller. Furthermore, this arrangement exploits dense packaging of multiple I/O device adapters 252, 254 to connect an overall increased number of I/O device adapters 252, 254 without adding more connections on the PCI local bus 230 or its backplane 200.

The function router 270 in the PCI multifunction device 260 effectively replaces the two required PCI bus connections with a single PCI bus connection 205. To enable the processor complex 100 to select a particular I/O device adapter 252 or 254 within this multifunction device, the PCI local bus specification configuration protocol appends a function number that ranges in value from 0 to 7 to the device identifier. The PCI local bus specification interchangeably uses the word "function" to refer to the I/O device adapters 250, 252, 254. Single function devices such as PCI device 240 are accommodated in this extended definition by implicitly responding as function zero within the scope of the device ID that selects its PCI bus connection. In essence, the single function PCI device 240 is accommodated within the expanded definition of multifunction device protocols and may be implemented therein by utilizing the function router 270 which merely implements only one function (function zero).

Given that the function number ranges in value from 0 to 7, a PCI multifunction device 260 is then architecturally capable of incorporating up to eight I/O device adapter elements within a single device that requires a single slot on the PCI local bus 230. The role of the function router 270 is to facilitate the sharing of the single slot amongst the multiple I/O device adapters 252,254 incorporated within the multifunction device 260. In particular, during configuration read and write protocols, the function router 270 uses the function number from this protocol to route the arguments of this protocol between the PCI local bus 230 and the associated PCI I/O device adapters 252 or 254 within the multifunction device 260.

The PCI local bus specification provides for a PCI device reset that is activated by sending a reset signal (RST#) to a designated pin on a PCI compliant device. The reset signal (RST#) is activated during power up or power down of the PCI device, during error recovery procedures, or upon a power failure. More specifically, the reset signal (RST#) asynchronously disables (floats) the outputs of PCI components and generally resets the PCI bus interface elements of the I/O device adapter, wherein the states of some elements are defined and some are not.

One limitation of the PCI local bus specification is the lack of a well-defined reset procedure or a reset state that permits the I/O device adapter to exhibit predictable behavior during and after the reset. In other words, the PCI local bus specification contains incomplete and ill-defined procedures and mechanisms for performing a reset. This incomplete definition leads to different and perhaps unpredictable effects for each vendor-specific implementation of a PCI compatible device.

Another limitation of the PCI local bus specification is the lack of a variety of resets. The PCI reset signal (RST#) only specifies a reset state that is directed at a limited set of PCI bus interface elements but that does not address the states of other elements of the I/O device adapter or I/O devices connected thereto.

Yet another limitation of the PCI local bus specification is the lack of a directed reset that affects a selected I/O device or single functions within a multifunction device without affecting other, non-selected I/O devices or single functions of a multifunction device connected to the PCI local bus. Thus, the PCI local bus specification does not specify a granular control of components within a single function device or for a specific function within a multifunction device. Currently, only the reset signal (RST#) is specified which implicitly affects all entities connected to the PCI local bus including the entirety of a single-function device and all functions within a multifunction device.

Still another limitation of the PCI local bus specification is the rudimentary built-in self-test facility outlined in the PCI local bus specification. The PCI local bus specification merely defines a built-in self test register consisting of a built-in self-test capable bit indicating whether the device is capable of performing a built-in self-test, a stall built-in self-test field that triggers the initiation of a built-in self-test, and a completion code field that stores a completion code upon completion of the built-in self-test. The PCI specification lacks a built-in self-test mechanism having control sequences, synchronization, and completion signals particularly for (1) a multifunction device as a whole and (2) individual PCI device functions within a multifunction device.

SUMMARY AND OBJECTS OF THE INVENTION

An object of the present invention is to remove the above problems in the PCI local bus specification for use with multifunction devices in particular and in I/O systems in general.

Still another object of the invention is to provide a variety of reset procedures and corresponding reset states that permit the multifunction device and the connected I/O device adapters to exhibit a variety of predictable behaviors during and after the resets.

Yet another object of the invention is to facilitate selective reset mechanisms and built-in self-test techniques for components within a single function device adapter and single function device adapters connected to a multifunction device.

Another object of the present invention is to provide a system, apparatus and method that selectively resets and tests single-function and multifunction devices.

Another object of the invention is to provide a well-defined reset procedure and a reset state that permits the I/O device adapter to exhibit predictable behavior during and after a reset.

The objects of the present invention are achieved by providing a device reset control register for each single function device and for each I/O device adapter within a multifunction device. The device reset control register permits an I/O device driver and reset/testing decision logic to coordinate and control a variety of selective reset procedures for single function devices and I/O device adapters within multifunction devices.

The objects of the present invention are further achieved by providing three unique reset procedures and corresponding reset states: a logical power on reset procedure, a directed unit reset procedure and a directed interface reset procedure are defined to provide a variety of corresponding reset states ranging from a relatively hard or destructive reset to a relatively soft or nondestructive reset to a functional reset, wherein the term destructive refers to erasing/resetting the contents of volatile storage devices in the I/O device adapter and/or I/O device.

The objects of the invention are further achieved by providing a device immediate status register for each multifunction device and for each I/O device adapter within a multifunction device. The multifunction device immediate status register permits, for example, the reset/testing decision logic to indicate that the desired reset state has been achieved such that the I/O device driver can monitor the device immediate status register and thereby determine when to conclude the reset procedure and perform another function.

The objects of the invention are still further achieved by providing an I/O device driver programmed with a logical power on reset procedure, a directed unit reset procedure and a directed interface reset procedure that bring a selected single function or multifunction device into a well-defined and predictable logical power on reset state, directed unit reset state or directed interface reset state.

The objects of the invention are still further achieved by providing an I/O device driver programmed with a built-in self-test procedure that sequentially examines each built-in self-test control/status register to synchronize and control the initiation, execution, and completion of built-in self-tests of multifunction devices connected to the local bus. The multifunction input/output device connected on a bus to a computer system with an input/output device drive has a built-in self-test status/control register having at least one global control field, at least one global status field, and at least one unique function status field. The global fields comprise a built-in self-test capable field indicating whether any of at least one input/output device adapter connected to the multifunction device is capable of performing a built-in self test, a start built-in self-test field set by the I/O device driver to indicate the start of built-in self-test across the multifunction device, and a global completion code field to indicate that all of at least one input/output device adapter connected to the multifunction device has completed a built-in self-test. The register in the multifunction device also has a function completion code field to indicate a particular input/output function associate with an input/output device adapter connected to the multifunction device has completed a built-in self test. Performing built-in self-tests on a computer system having a multifunction input/output device attached to it starts with initiating a built-in self-test by receiving a power-on reset signal or a start built-in self-test signal, or a Peripheral Computer Interface (PCI) reset signal. The input/output device driver determines if the multifunction input/output device or any attached function is capable of running the built-in self-test by reading a function 0 and a built-in self-test capable field in a register in the multifunction device. If the multifunction device is capable of running the built-in self-test, the computer system has a predetermined time to run the test on the multifunction input/output device and all attached functions. The input/output device driver determines if the built-in self-test has completed in the multifunction input/output and all attached functions by reading a start built-in self-test field and a global completion status field and a function completion status field in the register. If the built-in self-test has completed, the input/output device driver initializes all of the functions. If the input/output device driver detects that the built-in self-test has not completed after a predetermined time after the step of initializing, the input/output device driver isolates and recovers any errors of the multifunction device and any attached function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the air from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4(c) illustrates a conventional built-in self-test (BIST) control/status register that is utilized in the inventive system of FIGS. 3 and 4(a);

FIG. 4(d) illustrates a device immediate status register that is utilized in the inventive system of FIGS. 3 and 4(a);

DETAILED DESCRIPTION OF PREFERRED EMBODIMENTS

Figure 1A:
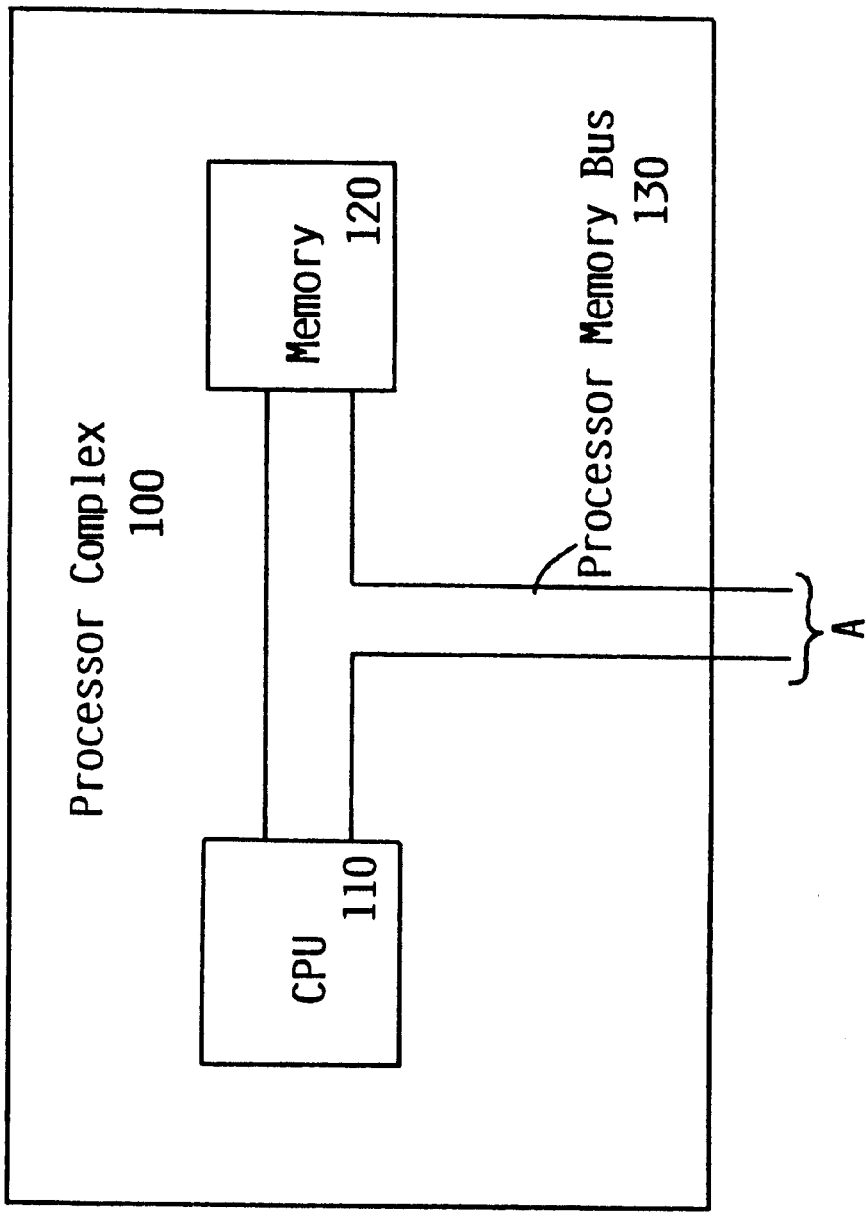
FIG. 1 illustrates a conventional computer system implementing the PCI local bus specification and including single-function PCI devices having embedded and removable connections.
Figure 1B:
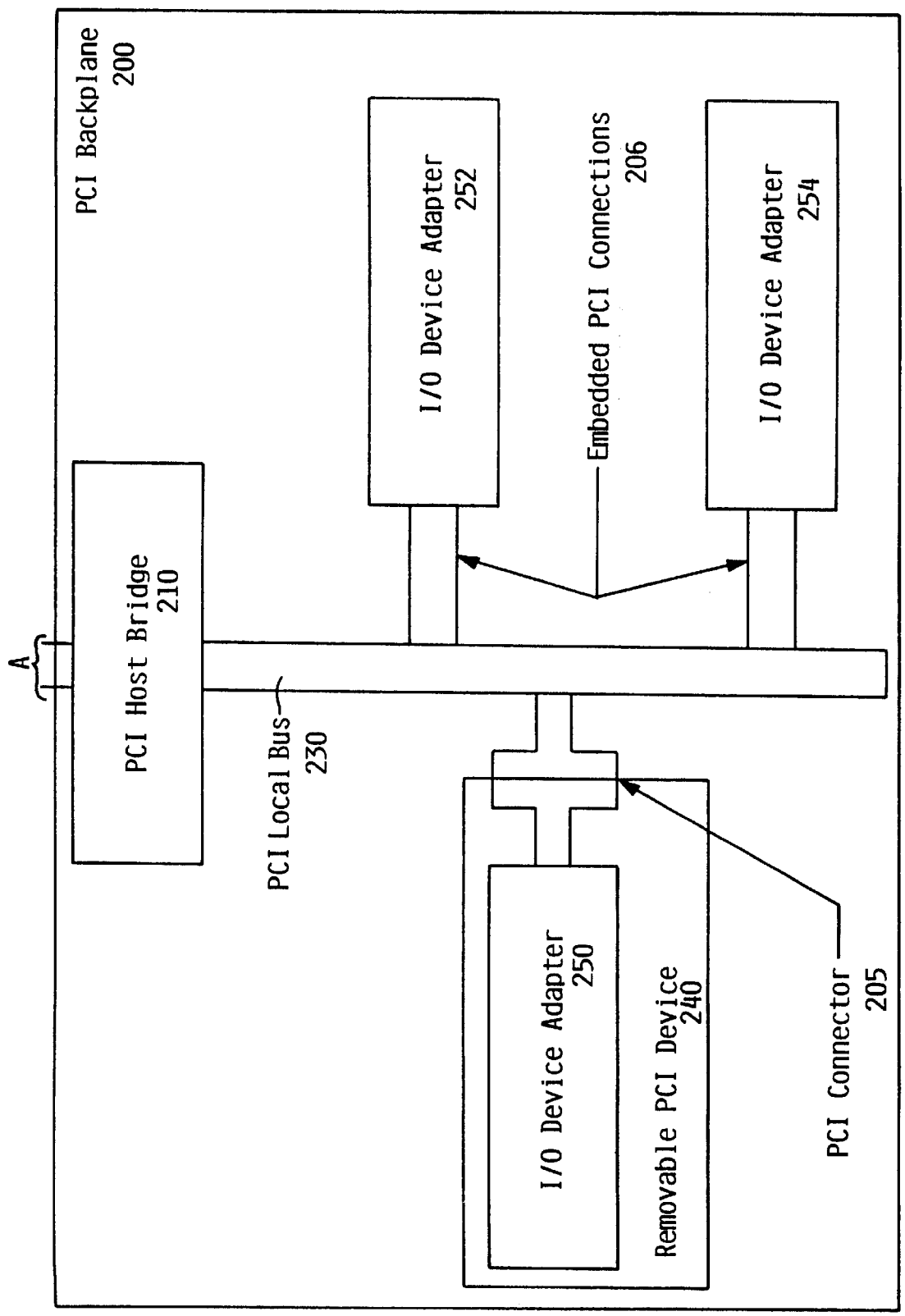
Figure 2A:
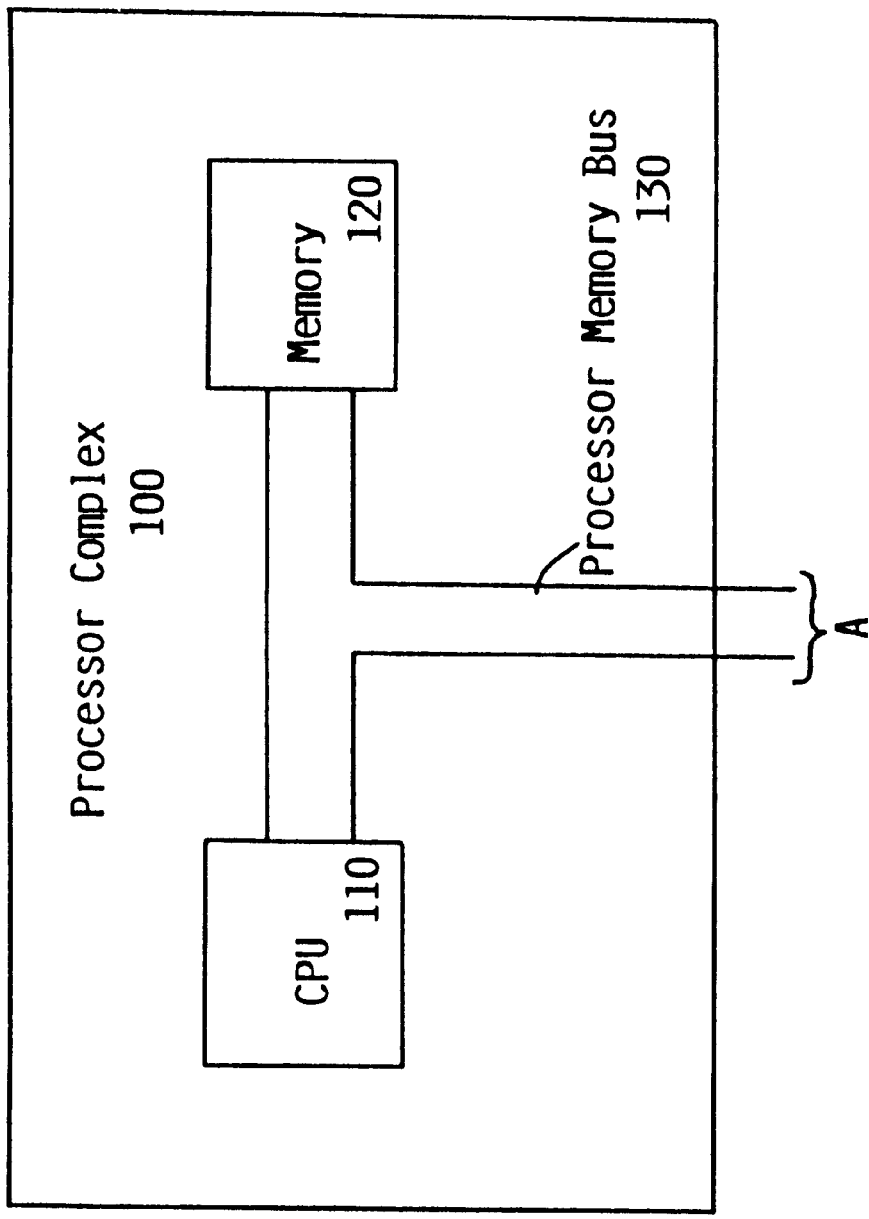
FIG. 2 illustrates a conventional computer system implementing PCI local bus specification including single function and multifunction PCI devices having removable connections to the PCI local bus.
Figure 2B:
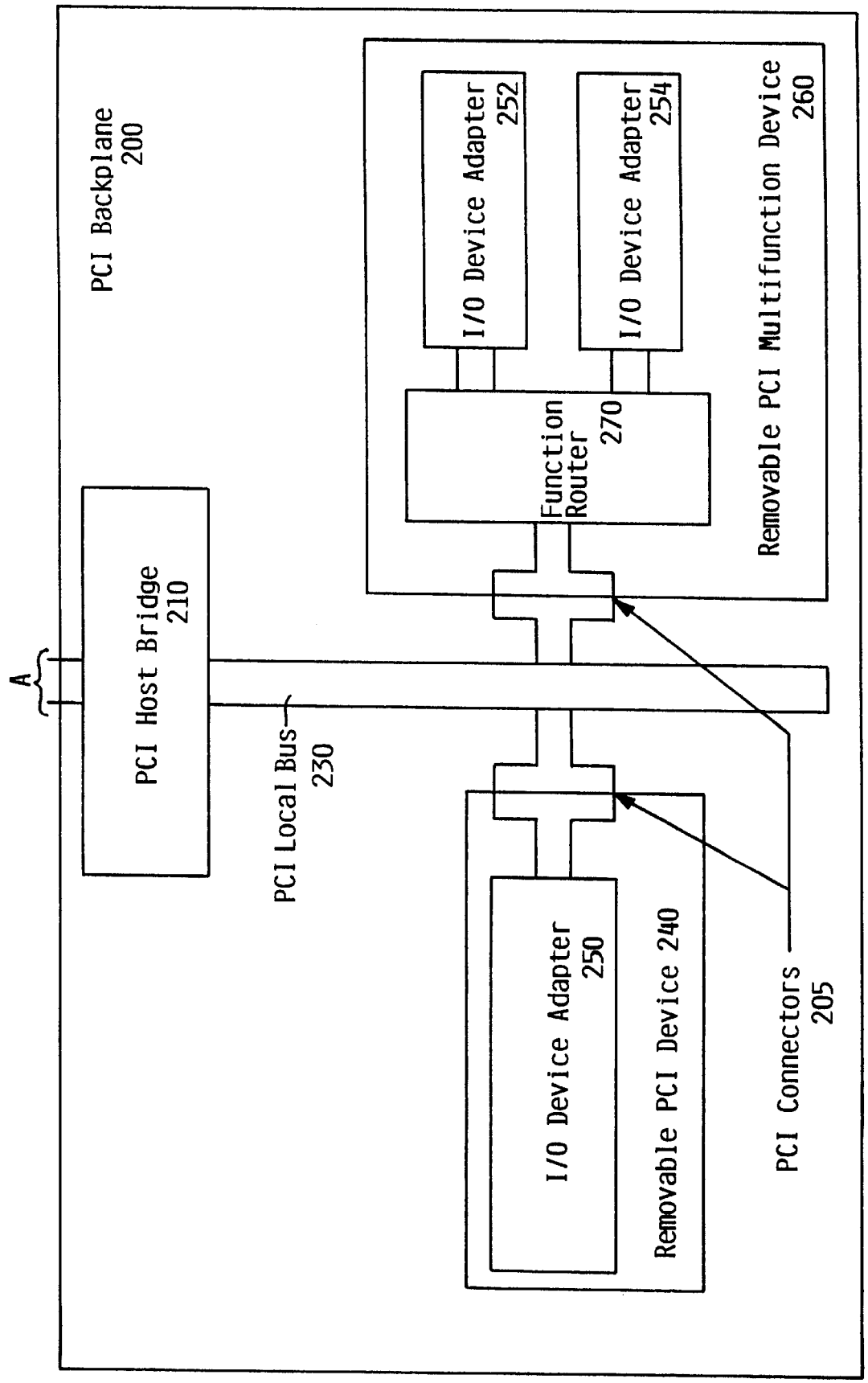
Figure 3A:
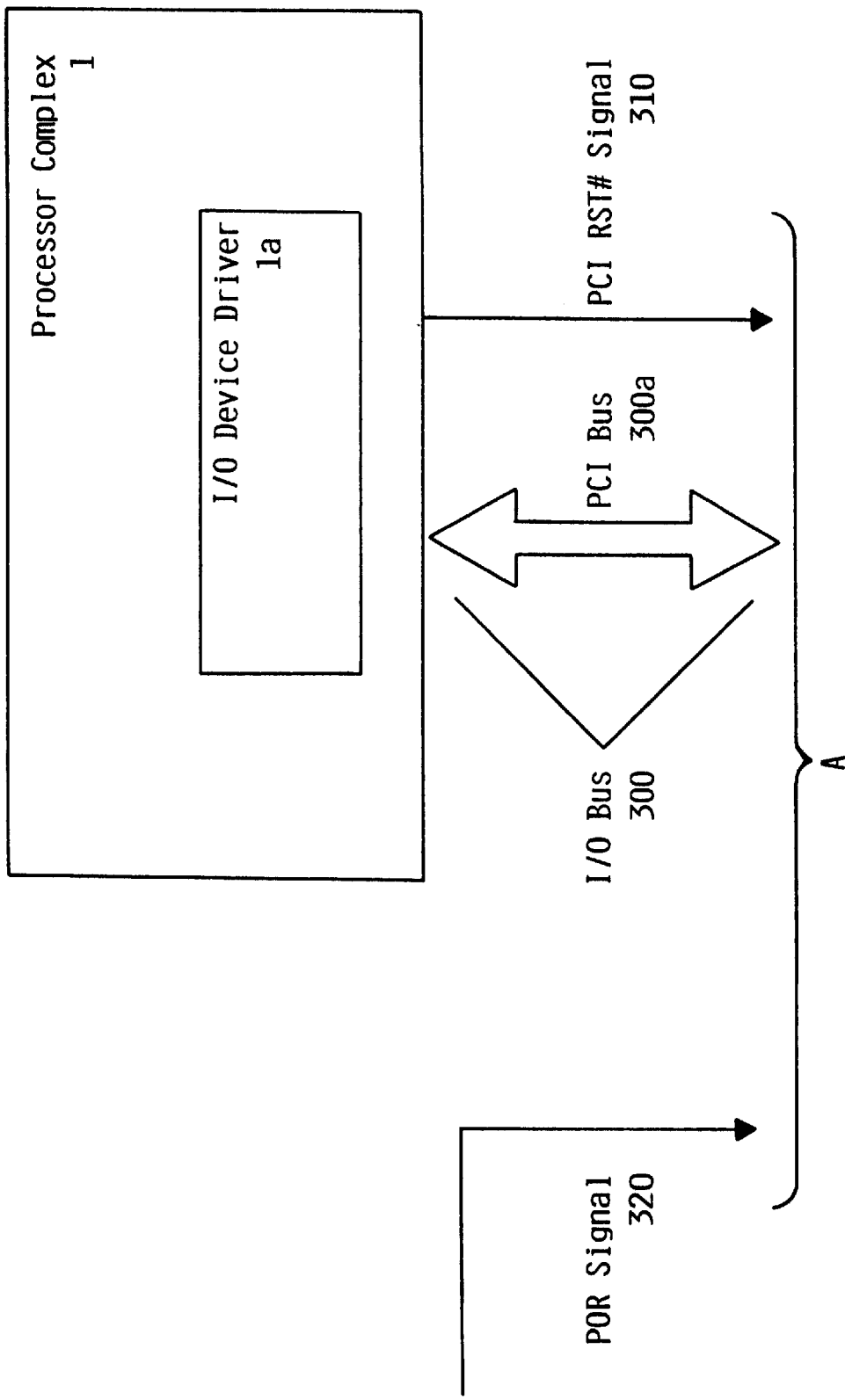
FIG. 3 illustrates a computer system according to the invention implementing selective reset and testing of a single-function device.
Figure 3B:
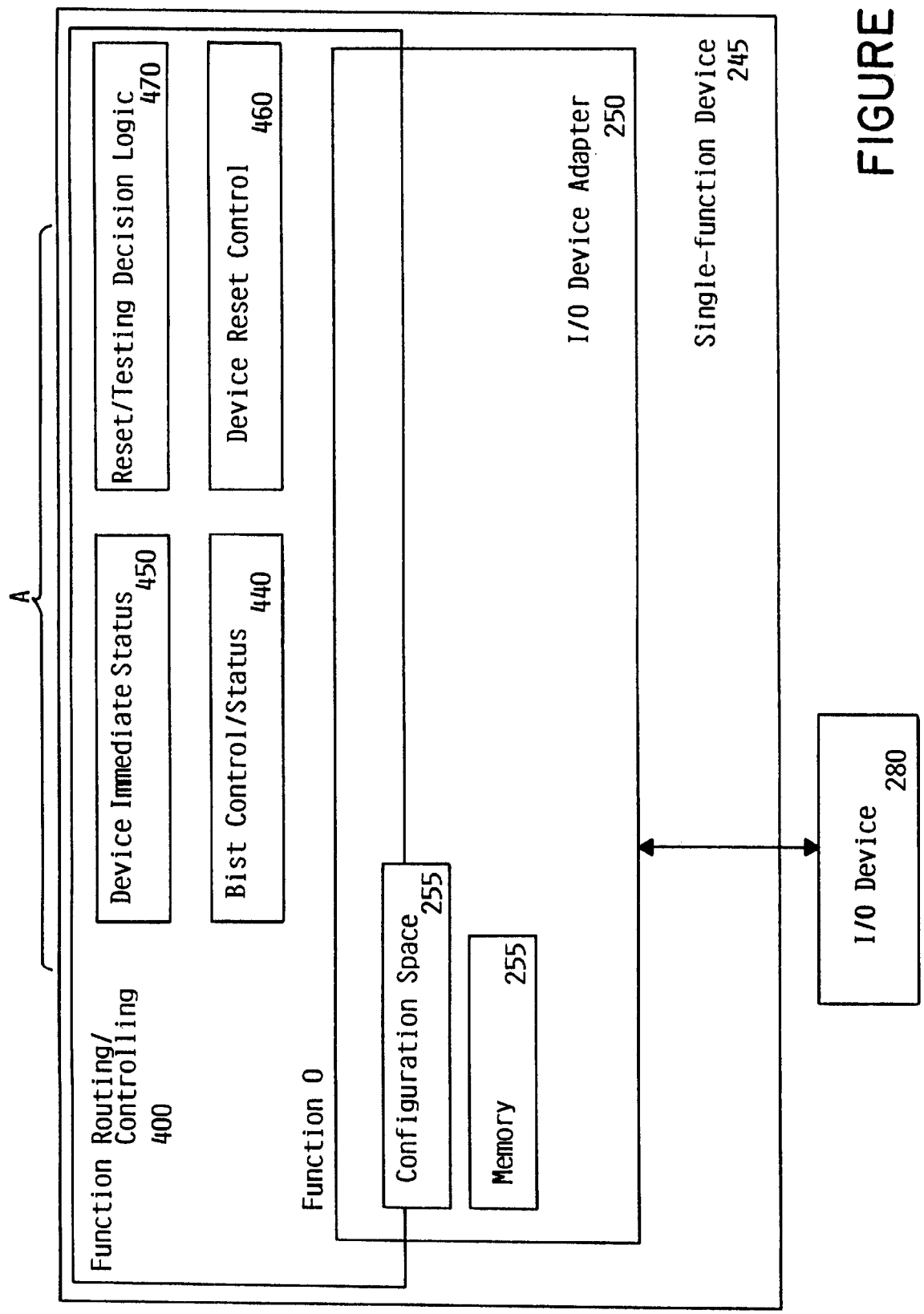

FIG. 3 illustrates a computer system according to the invention for implementing enhanced resets and built-in self-tests for single-function device 245. The processor complex 100 has a central processing unit (CPU) 110 and memory 120 interconnected by a processor memory bus 130. The processor complex 100 further includes an I/O device driver 140 that controls and otherwise manages each of the I/O components in the system. The I/O device driver 140 of the present invention includes unique elements and functionality that will be described in relation to FIGS. 5–8 below.

As further illustrated in FIG. 3, the inventive computer system includes a single-function device 245 connected to the processor complex 100 via I/O bus 300. Preferably, the I/O bus 300 is implemented with a PCI bus 300a conforming to the PCI local bus specification. Furthermore, the single-function device 245 may receive a power on reset (POR) signal 320 and reset signal 310. The power on reset signal (POR) 320 is generated by other hardware within the system at certain system resets. If the preferred PCI bus 300a is being utilized then the reset signal 310 is the standard PCI reset signal (RST#).

A function routing/controlling facility 400 is located within the single-function device 245 and routes data and/or control signals between the I/O device driver 140 and the I/O device adapter 250 via I/O bus 300. Because FIG. 3 is directed to a system for configuring a single function device 245, only one I/O device adapter 250 is connected to the function routing/controlling facility 400. Specifically, the I/O device adapter 250 is implemented at function zero within the single function device 245. The I/O device adapter 250 preferably includes a configuration space 255 and/or memory 260. Even more preferably, the configuration space 255 conforms to the PCI local bus specification. Furthermore, the configuration space 255 is connected to the reset/testing decision logic 470 via function zero slot.

Furthermore, an I/O device 280 is connected to the I/O device adapter 250 as shown in FIG. 3. The I/O device 280 includes a variety of I/O devices such as mass storage devices, printers, scanners, MODEMs, network links, etc.

The function routing/controlling facility 400 further includes built-in self-test control/status register 440, device immediate status register 450, device reset control register 460, and reset/testing decision logic 470. The built-in self-test control/status register 440, the device immediate status register 450, and the device reset control register 460 and the reset/testing decision logic may be interconnected and connected to the I/O device adapter in a variety of configurations. For example, the registers 440, 450, 460 may be connected to the reset/testing decision logic 470 which, in turn, is connected to the I/O device adapter 250. As an alternative, the registers 440, 450 and 460 may be directly connected to both the reset/testing decision logic 470 and the I/O device adapter 250. Further, as an alternative, the function routing control and reset/testing decision logic may be an integral element of the I/O device adapter and may be implemented within the I/O device adapter configuration space.

Because the implementation shown in FIG. 3 is for a single-function device 245 having a single I/O device adapter 250, only one instance of each of the registers 440, 450 and 460 needs to be included in the function routing/controlling facility 400.

Figures 1, 4A:
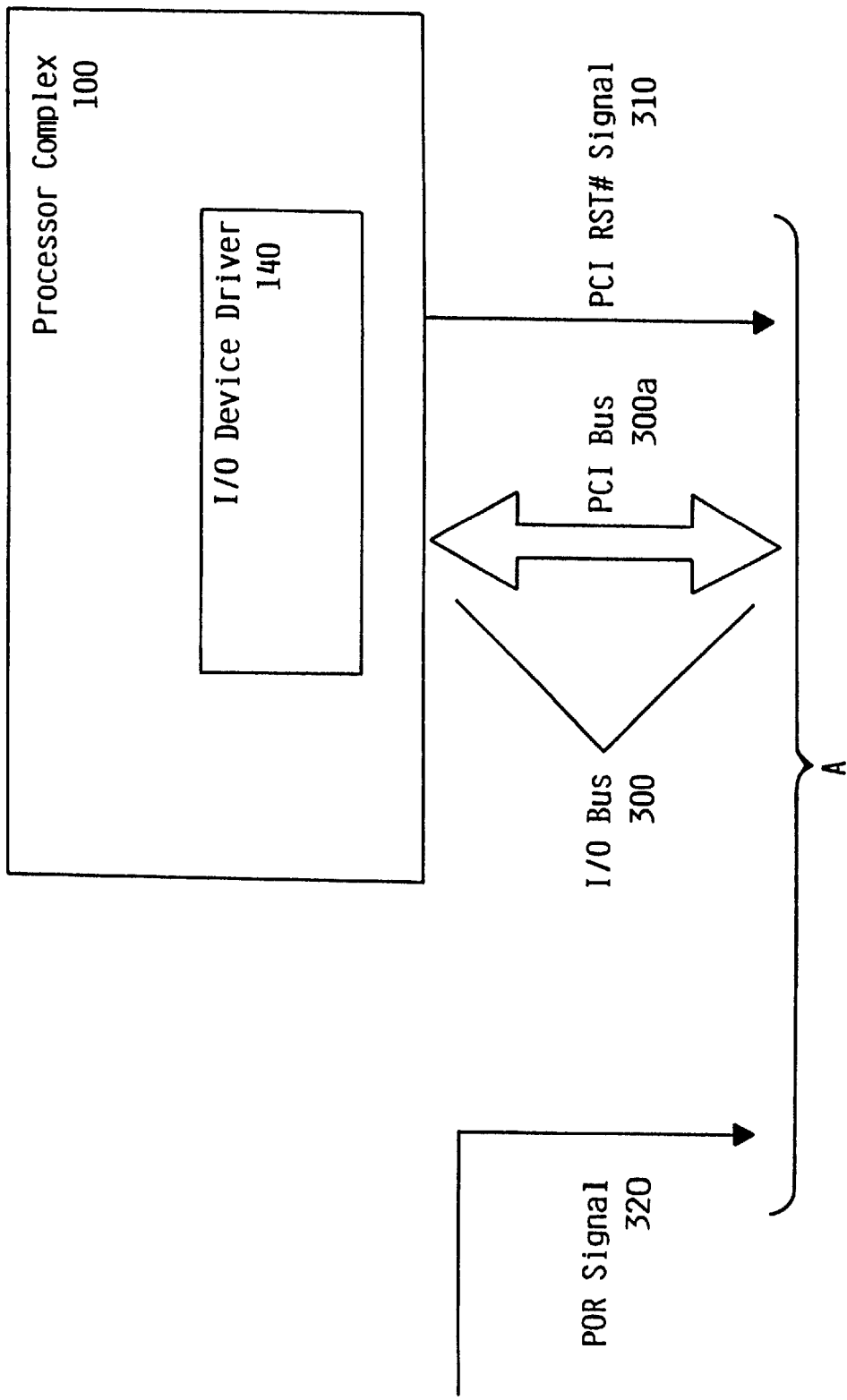
FIG. 4(a) illustrates a computer system according to the invention implementing selective reset and testing of a multifunction device.
Figures 2, 4A:
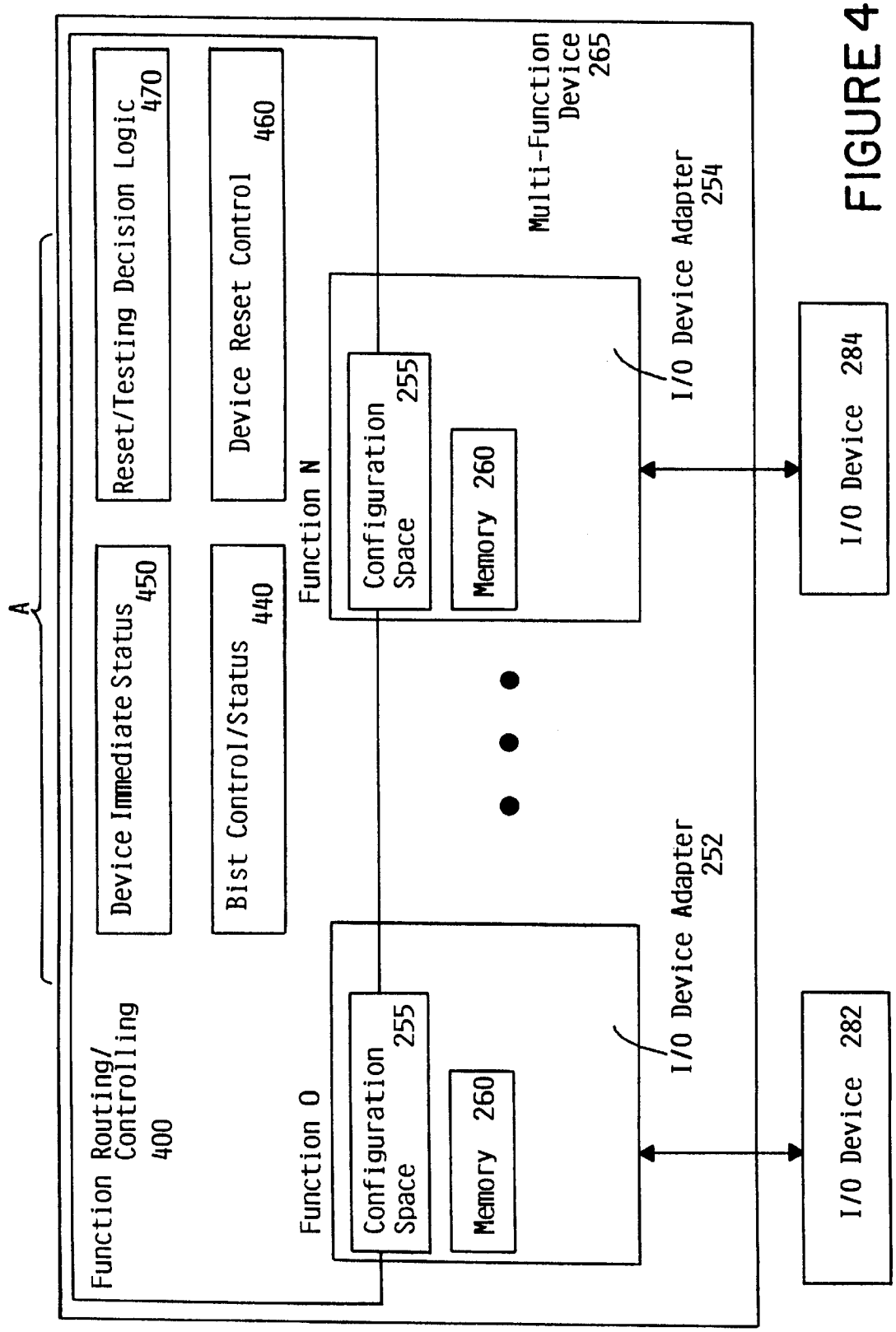
Figure 4B:
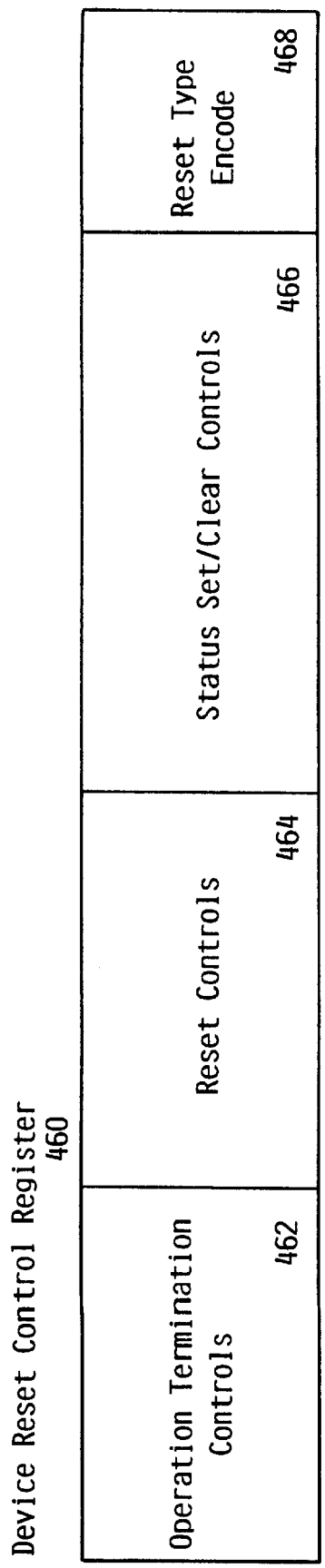
FIG. 4(b) illustrates a device reset control register that is utilized in the system of FIGS. 3 and 4(a) for selective reset and testing.

FIG. 4(*a*) illustrates a computer system for selective reset and testing of a multifunction device 265. Like FIG. 3, FIG. 4(*a*) illustrates a computer system including a processor complex 100 having an I/O device driver 140 provided therein. An I/O bus 300 interconnects processor complex 100 and multifunction device 265. Preferably, the I/O bus 300 is a PCI bus 300*a* conforming to the PCI local bus specification.

The multifunction device 265 further shown in FIG. 4(*a*) includes function routing/controlling facility 400 to which are attached a plurality of I/O device adapters 252, 254. The I/O device adapters 252, 254 are connected at respective slots or connection points that are labeled Function 0 through Function N. Although a single type of I/O device adapter 250 may be utilized, it is to be understood that a variety of types of I/O device adapters 252,254 may be connected to the multifunction device 265 thereby providing a plurality of different types of interfaces for different types of I/O devices 282, 284 connected to each I/O device adapter 252,254.

In contrast to the single-function device 245 shown in FIG. 3, the multifunction device 265 shown in Figure a includes a corresponding one of the following registers for each I/O device adapter 252, 254 connected therein: built-in self-test control/status register 440, a device immediate status register 450, and device reset control register 460. Furthermore, each field within each of these registers uniquely corresponds to one of the I/O device adapter 252, 254 connected to the multifunction device 265. For example, one device reset/control register 460 is used to control a corresponding one of the I/O device adapters 252, 254 connected to the multifunction device 265.

Reset/testing decision logic 470 is also provided in the function routing/controlling facility 400 and is connected to the function configuration space 255 in each of the I/O device adapters 252, 254. Instead of individually connecting each I/O device adapter 252, 254 to the reset/testing decision logic 470, a multiplexer, not shown, may be utilized to provide an appropriate, routed connection between the reset/testing logic 470 and each of the I/O device adapters 252, 254 connected thereto and may be addressed by the device identifier and function number address from the processor complex 100 to select the desired I/O device adapters 252, 254.

In general, the reset/testing decision logic 470 must have a direct or indirect connection to registers 440, 450, and 460 to permit reading and writing of the values contained therein. The reset/testing decision logic 470 must also be directly or indirectly connected to the I/O device adapters 250, 252, 254 to permit evaluation and control thereof.

As shown in FIG. 4(*b*), the device reset control register 460 includes operation termination controls 462, reset controls 464, status set/clear controls, and reset type encode field 468 each of which correspond to the I/O device adapter 250 in the single-function device 245.

The operation termination controls 462 include a variety of control bits that correspond to and are used to control the termination of operations performed by the I/O device adapter 250. The operations performed by the I/O device adapter 250 that may be terminated by the operation termination controls are conventional operations performed by the I/O adapter and/or I/O device 282 such as memory operations. For example, if the I/O device is a mass storage device, direct memory accesses to the memory 120 within the processor complex 100 is typically used to transfer data thereto. Such memory operations may be terminated by setting a corresponding bit in the operation termination controls 462. The operations that may be terminated are dependent upon the implementation and may be terminated by setting a corresponding bit in the operation termination controls 462. As an alternative to using a bit for each operation that may be terminated, the operation termination controls 462 may be used to store codes each of which uniquely indicating an operation that is to be terminated. In this way, the word length of the operation termination controls 462 may be reduced. This same technique may be also applied to the other registers 440 and 450.

The reset controls 464 within the device reset control register 460 include a variety of control bits that correspond to and are used to control the setting/resetting of flags and/or parameters in the I/O adapter's 250 configuration space 255. For example, the configuration space 255 contains control flags that permit the I/O device adapter 250 to perform target I/O operations and target memory operations and to act as a master on the I/O bus 300. The reset controls 464 control the setting/resetting of such control flags to bring the I/O device adapter into a desired reset state.

The status set/clear controls 466 in the device reset control register 460 are used to control whether the device immediate status register 450 may be set or cleared. The status set/clear controls 466 may also be used to control other status bits in the function routing/controlling registers such as the built-in self-test control/status register 440.

The reset type encode field 468 stores a code indicating the type of reset procedure to be executed. The set of enhanced resets defined herein include the logical power on reset, directed unit reset and directed interface reset each of which has a unique, corresponding code that may be stored in the reset type encode field 468. The I/O device driver writes the reset type code into the reset type encode field 468 via bus 300.

The I/O device driver must first read registers of the configuration space of function 0 of the multifunction device before the I/O device driver can read any other register in the multifunction device. Only after determining the device is a multifunction device by reading function 0, does the I/O device driver determine what other functions are associated with the multifunction device. The I/O device driver may read and write to function 0 or other functions of the multifunction device only when other events are not in progress, e.g., a BIST test, or when the PCI reset (RST#) is active. As shown in FIG. 4(c), the built-in self-test (BIST) control/status register 440 for a multifunction device 265 includes at least one BIST capable field 442, at least one start BIST field 444, at least one completion code field 446, and at least one function completion status field 448. The BIST capable field bits 442 and the global completion status field bits 446 of the BIST control/status register 440 are global to all functions of a multifunction device 265 and contained logically within the multifunction device routing/decision logic element 400. Within the BIST capable field 442, a global status bit is defined to be the logical OR of all functions within the multifunction device 265 and indicates if any I/O device adapter attached to the multifunction device adapter 252, 254 is capable of performing a built-in self-test. Bits within the start BIST field 444 when written from the PCI bus to "1" at any function of the multifunction device is a global control bit that causes start BIST to be activated in all functions. Bits within the start BIST field 444 when read from the PCI bus is a global control bit and returns the logical OR of the state of start BIST in all functions regardless of whether BIST is implemented globally to one multifunction device 265 or individually to each function of the multifunction device 265. The global completion status field 446 contain global status bit(s) of the BIST completion status of the global elements of the multifunction device, such as the global and common PCI bus interface elements, the routing/decision logic, etc. The function completion status field 448 contains bits that are unique to the function at which the BIST register is read from the PCI bus and indicate the BIST completion status relative to that function only.

The device immediate status register 450 has a single field that stores a status acknowledge indication for the corresponding I/O device adapter 250. In other words, the device immediate status register 450 provides a facility for the I/O device driver 140 to query the state of the corresponding I/O device adapter 250 and to determine when to continue with further processing.

The set of enhanced resets defined herein include the logical power on reset, directed unit reset and directed interface reset in addition to the further definition and procedure for handling built-in self-tests as described above. These enhanced resets provide a granular reset capability permitting a greater range of control over the I/O adapters 250, 252, 254.

The I/O device driver 140 and reset/testing decision logic 470 may be implemented with hardware, software, firmware or a combination of these implementations. For example, the I/O device driver 140 may be implemented with a separate processor and memory programmed with the logic processes illustrated in FIGS. 5–8. As an alternative, the I/O device driver 140 may be a completely hardwired element including look-up tables stored in read only memory that are accessed by a programmable logic array. The choice of which implementation to utilize is a design choice that may be made by those of ordinary skill in the art.

Operation of the Preferred Embodiments

Both the single-function and multifunction implementations respectively shown in FIGS. 3 and 4(a) operate by utilizing the processes illustrated in FIGS. 5–8. In particular, the I/O device driver 140 and the processor complex 100 execute the processes illustrated in FIGS. 5–8 to perform the testing and resetting procedures of the invention.

Built-In Self-Test Procedure

The built-in self-test procedure according to the invention generally involves examining each I/O device adapter 252, 254 attached to each multifunction device 265 to determine completion of the built-in self-test of the device adapters 252, 254 and the multifunction device 265 and any device errors that have occurred.

Figure 5A:
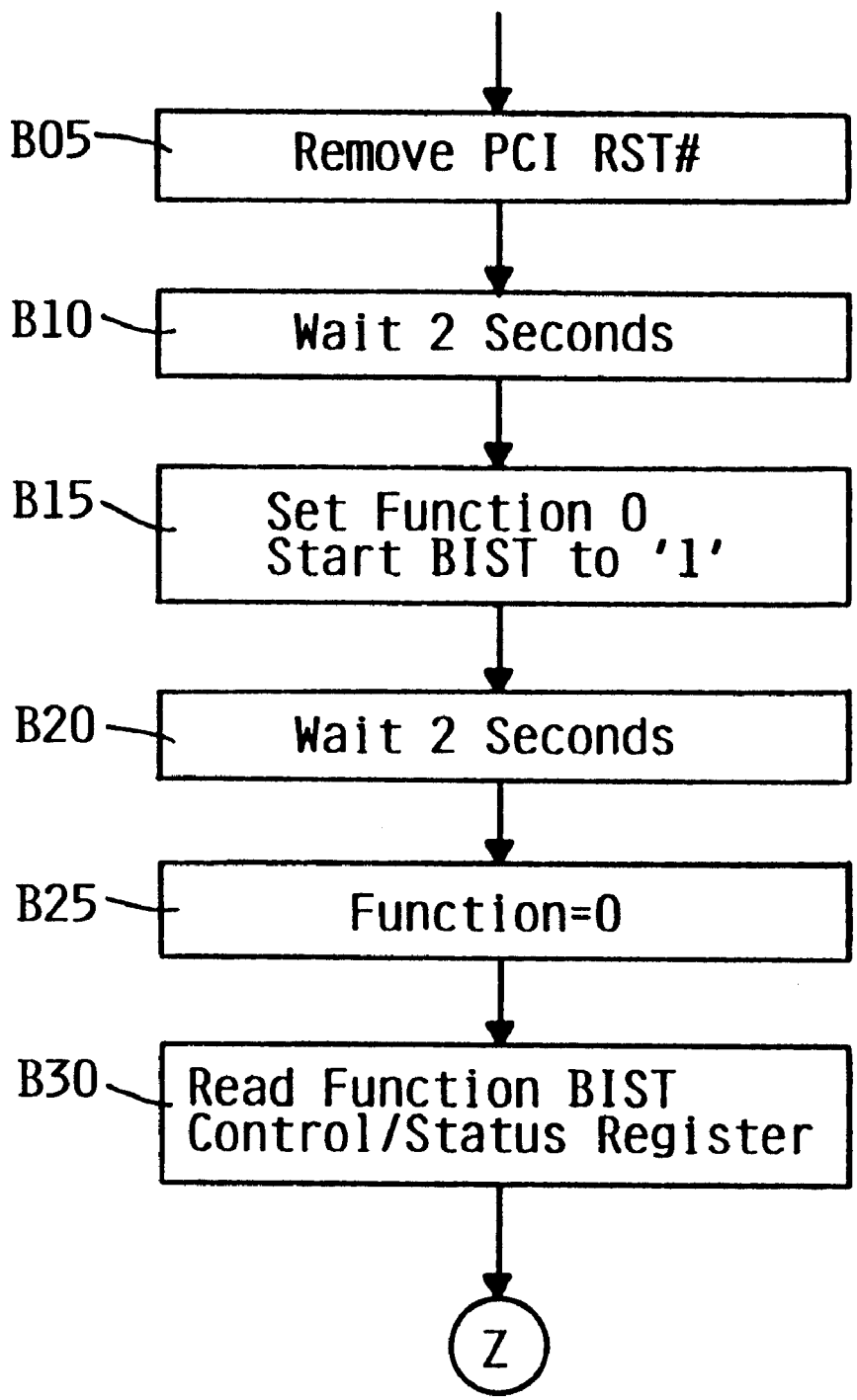
FIG. 5 illustrates a high-level flow chart of a built-in self-test process performed by an I/O device driver.
Figure 5B:
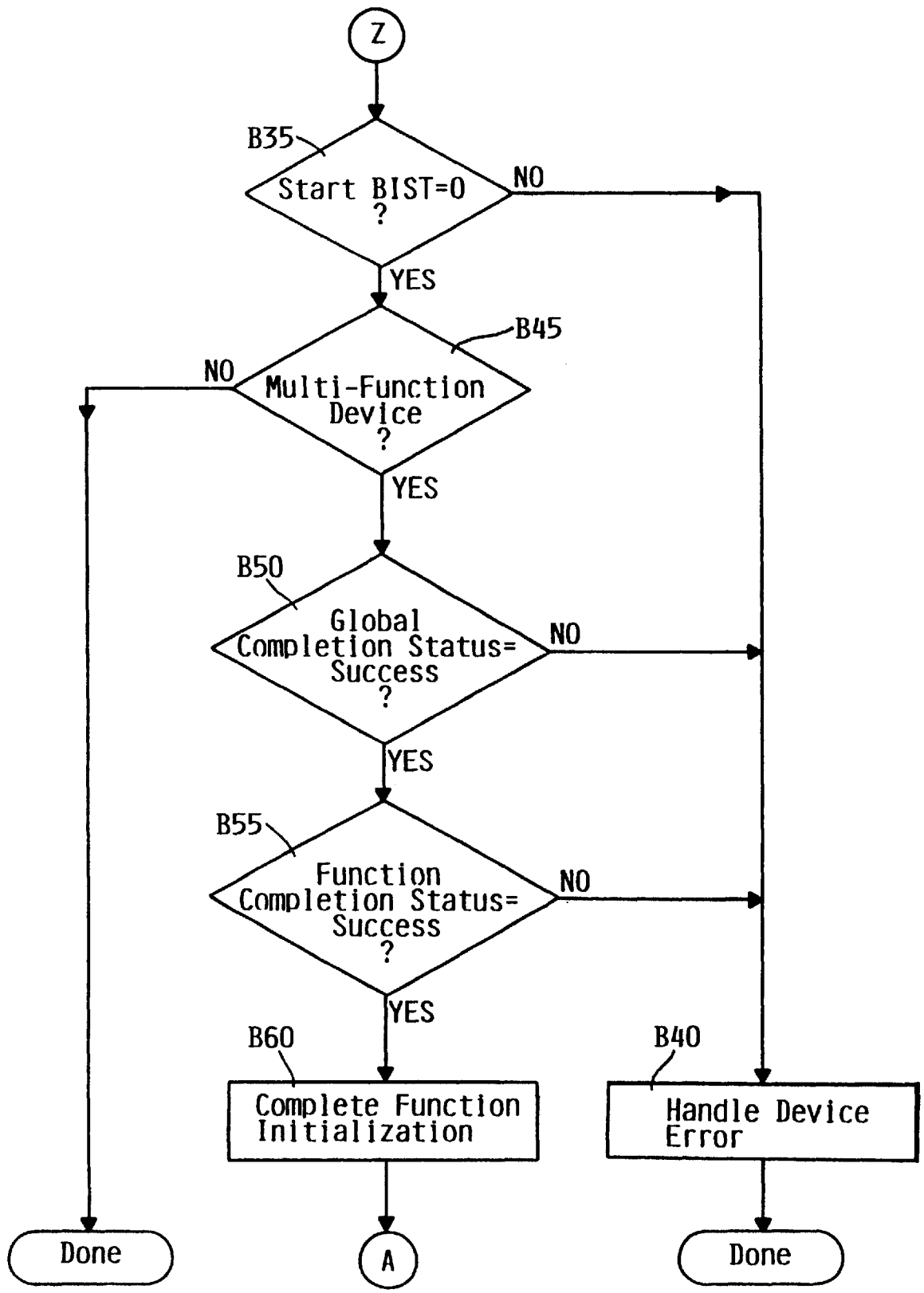
Figure 5C:
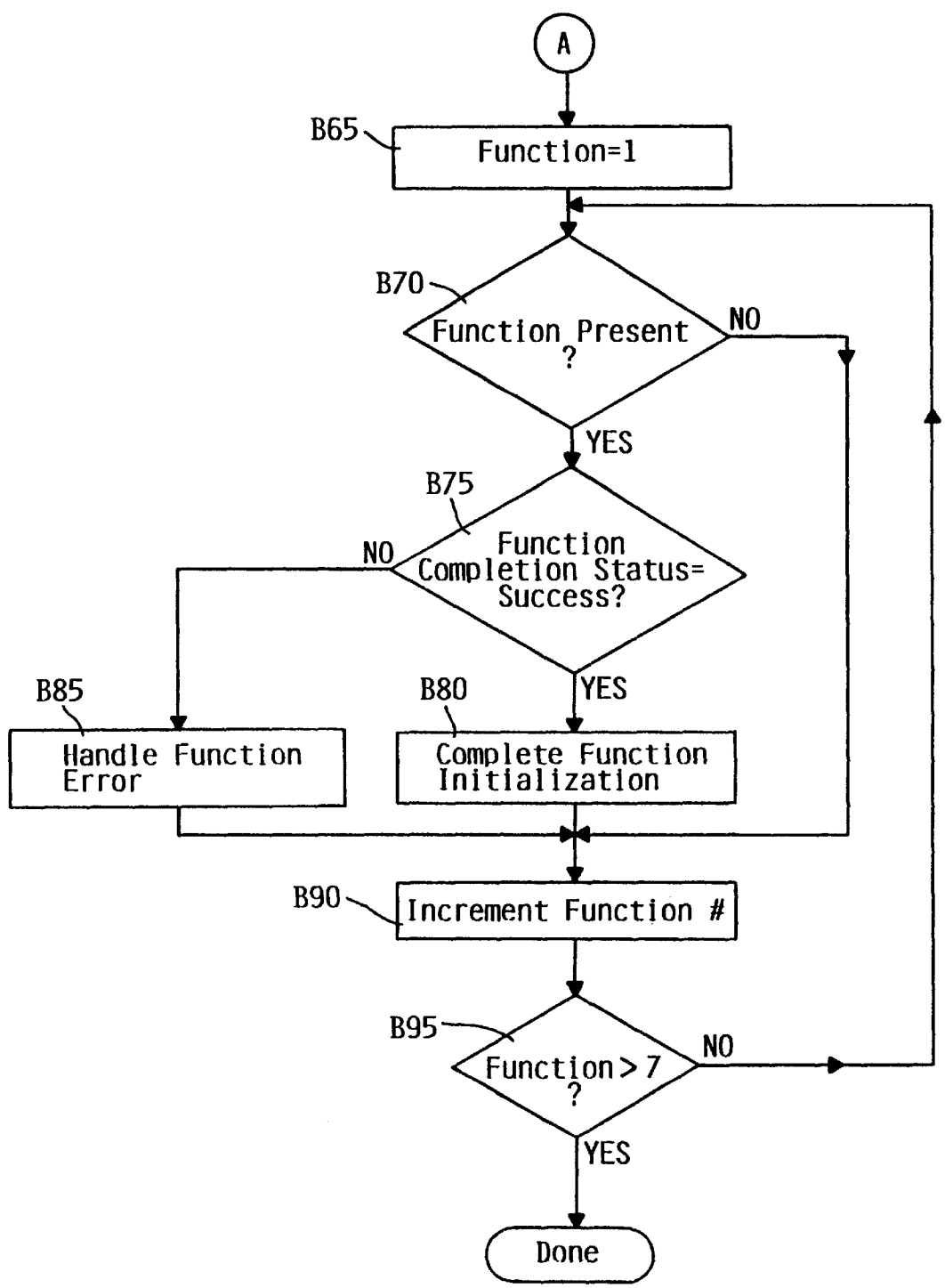

A built-in self-test initiation event, such as a power-on reset (POR) signal 320, or a PCI reset, or setting the start BIST field 444 in the BIST control/status register 440, initiates the built-in self-test procedure illustrated in the flow chart of FIG. 5. If the PCI multifunction device is designed to automatically start BIST following a power-on event, the I/O device driver removes the PCI reset signal (RST#) in step B05 and allows for a two second delay for BIST to complete in the multifunction device in step B10. The function bit 0 is set in the multifunction device 265 and the start BIST field 444 in the BIST control/status register 440 is set to a value indicating that BIST is starting, as in step B15 and B20. In the preferred implementation, the deassertion of the power-on reset signal 320 triggers the function routing/controlling facility 400 to execute the built-in self-test.

Completion of the built-in self-test should occur within a time period; the time period given in the PCI specification is two seconds. Following the specified delay, the I/O device driver reads the function 0 configuration device header type to determine if a multifunction device is present in step B30. If no multifunction device is present, the I/O device driver is done. If, however, a multifunction device is present, the I/O device driver reads the BIST capable 442 field in the BIST status/control register 440 of the multifunction device at function 0 to determine if BIST capability exists within the multifunction device or any I/O device adapters attached to the multifunction device as in step B45. The I/O device driver then queries the global completion status field 446 and the function completion status field 448 of the BIST status/control register 440, as in steps B50 and B55. If the BIST status is complete in both the global and function complete status fields, then the function is initialized as in step B60; otherwise if both or neither are complete, then the I/O device driver isolates the failure and recovers the error as in step B40. If I/O device adapters having BIST capability are attached to the multifunction device and after the function(s) attached to the multifunction device is initialized, the I/O device driver sets up to query function of the multifunction device as in step B65. For each function in the multifunction device, a query is made to determine if a function is present and, if so, then has BIST completed successfully for that function, as in steps B70 and B75. If so, the function has been initialized as in step B80, the function number is incremented in step B90 and the inquiry proceeds for that function again up to the given number of functions available on the multifunction device, in this case, seven, as in step B95. In any event, whether it be the global completion status or the function completion status, if BIST is not completed for either, error isolation and recovery procedures are undertaken.

Enhanced Resets

The I/O device driver 140 uses the device reset control register 460 and device immediate status register 450 defined herein to provide enhanced resets that increase the functionality and provide a greater scope of control over the components and/or functions of a single function or multi-function device 245, 265. The multifunction device 265 is further provided with additional reset capabilities specifically targeted to the function routing/controlling facility 400 and plurality of I/O adapters 252, 254 within the multifunction device 265.

The reset/testing decision logic 470 provides control over the internal and external facilities of the single-function or multifunction device 245,265 which the defined reset capabilities will affect.

Logical Power-On Reset

The preferred embodiment of the invention provides a unique type of reset termed a logical power-on reset. Unlike the conventional power-on reset incompletely defined in the PCI local bus specification, the logical power-on reset procedure is a selective reset procedure that brings a selected I/O device adapter into a well-defined reset state. The selectivity of the power-on reset procedure forces a selected I/O device adapter to enter a power-on reset state without affecting other I/O device adapters.

Figure 6:
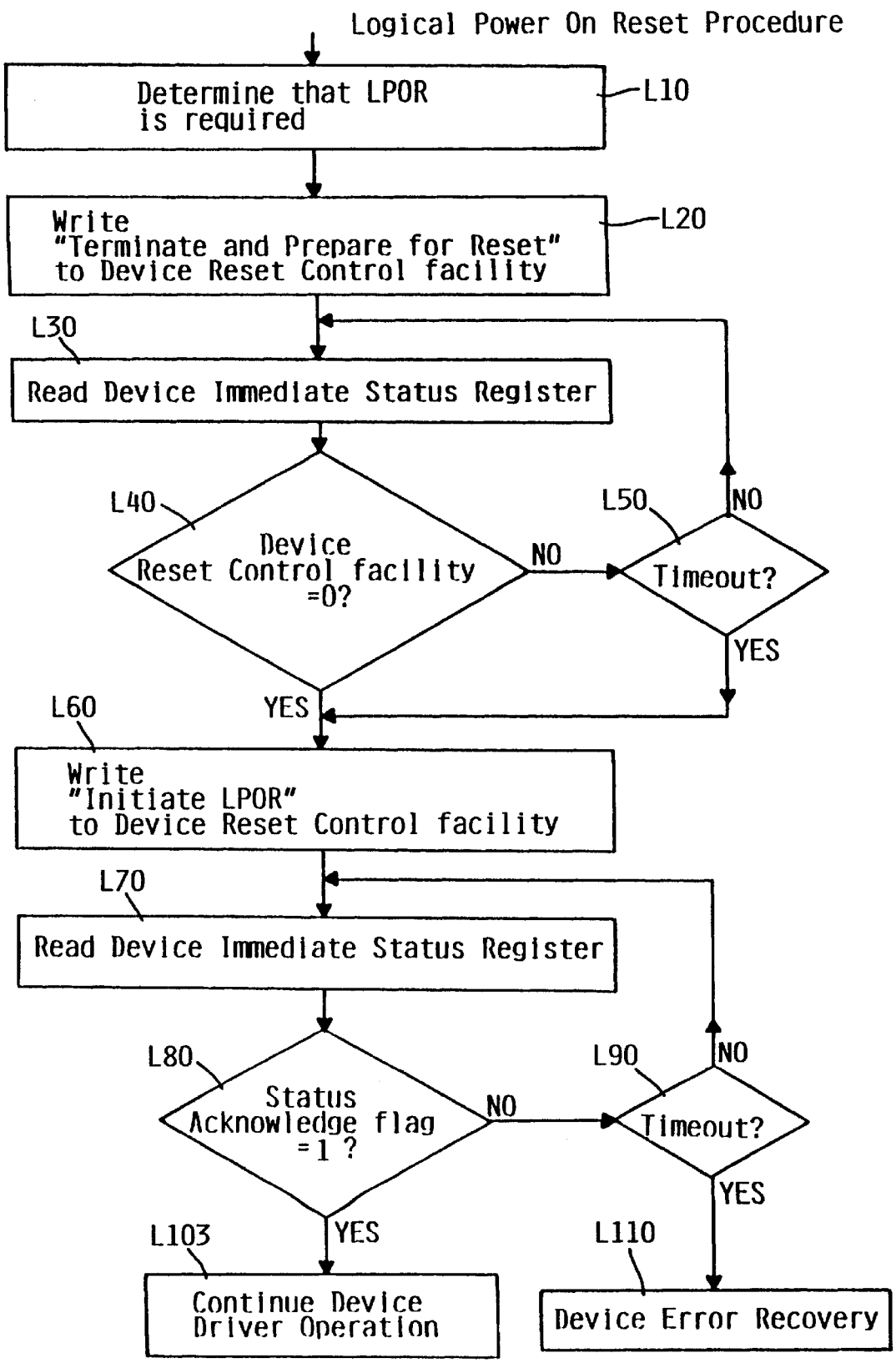
FIG. 6 illustrates a high-level flow chart of a logical power-on-reset process performed by an I/O device driver.

FIG. 6 illustrates the processing sequence executed by the I/O device driver 140 during logical power-on reset procedure. This procedure begins with the I/O device driver 140 determining that a logical power on reset is required in step L10. The I/O device driver 140 may internally determine that a logical power-on reset procedure is required or may receive a signal from another device that the logical power-on reset procedure should be executed.

In step L20, the I/O device driver 140 writes a terminate and prepare for logical power on reset command to the device reset control register 460. The terminate and prepare for reset command includes writing a logical power on reset code to the reset type encode field 466. The terminate and prepare for reset command further includes setting bits in the operation termination controls 462 and reset controls 464 to terminate active or pending operations such as target memory operations, target I/O operations and master operations and otherwise prepare for the impending logical power on reset. Such preparations further include setting the status acknowledge flag in the device immediate status register 250 to zero.

When the I/O device adapter 250 is ready for the logical power on reset, then the reset/testing decision logic 470 indicates this ready status in the reset controls 464 of the device reset control register 460.

The I/O device driver 140 then monitors the device reset control register 460 to determine if the I/O device adapter is ready for the logical power on reset. More specifically, the I/O device driver 140 executes steps L30 and L40 which read the device reset control register 460 and examine the reset controls 464 to determine if the I/O device adapter 250 is ready (e.g. device reset controls=0). Monitoring of the device reset control register 460 is only permitted for a certain period of time as indicated by timeout step L50; otherwise, the I/O device driver 140 may get trapped and wait indefinitely for the ready status to be indicated in the device reset control register 460.

After either steps L40 or L50, the I/O device driver then writes an initiate logical power on reset command to the device reset control register 460 which brings the single function device into the logical power on reset state.

The logical power on reset state includes the following semantics: disable the I/O device adapter 250 from participating in conventional target I/O operations, target memory operations and master operations; bring any volatile storage such as in memory 260 into an uninitialized state ready for reconfiguration; instruct the I/O device adapter 250 to perform all internal tests such as the built-in self-test described above; instruct the I/O device adapter to assert then deassert a power on reset signal to any devices it controls (e.g. instruct a multifunction device 265 to send a power on reset signal to the plurality of I/O device adapters 252, 254 connected thereto); and preserve all configuration states and information stored in built-in self-test control/status register 440, device immediate status register 450, device reset control register 460, and reset/testing decision logic 470. When the logical power on reset state has been achieved, the reset/decision logic 470 then sets the status acknowledge flag in the device immediate status register 450.

The I/O device driver 140 monitors the device immediate status register 450 to determine if the I/O device adapter has achieved the logical power on reset state. More specifically, the I/O device driver 140 repeatedly executes steps L70 and L80 which read the device immediate status register 450 and examine the contents thereof to determine if the I/O device adapter has achieved logical power on reset state (e.g. status acknowledge flag=1). Monitoring of the device immediate status register 450 is only permitted for a certain period of time as indicated by timeout step L90; otherwise, the I/O device driver 140 may get trapped and wait indefinitely for the ready status to be indicated in the device immediate status register 450.

If the logical power on reset state is achieved within the timeout period, then the I/O device driver 140 may continue with other device driver operations as indicated by step L100. Otherwise, a device error recovery process is executed in step L110 because the logical power on reset state should be achieved within the timeout period.

Directed Unit Reset

The preferred embodiment of the invention provides a second unique type of reset termed a directed unit reset. Unlike the conventional power-on reset loosely defined in the PCI local bus specification, the directed unit reset procedure is a selective reset procedure that brings a selected I/O device adapter into a well-defined directed unit reset state. The selectivity of the directed unit reset procedure forces a selected I/O device adapter to enter a directed unit reset state without affecting other I/O device adapters.

Figure 7:
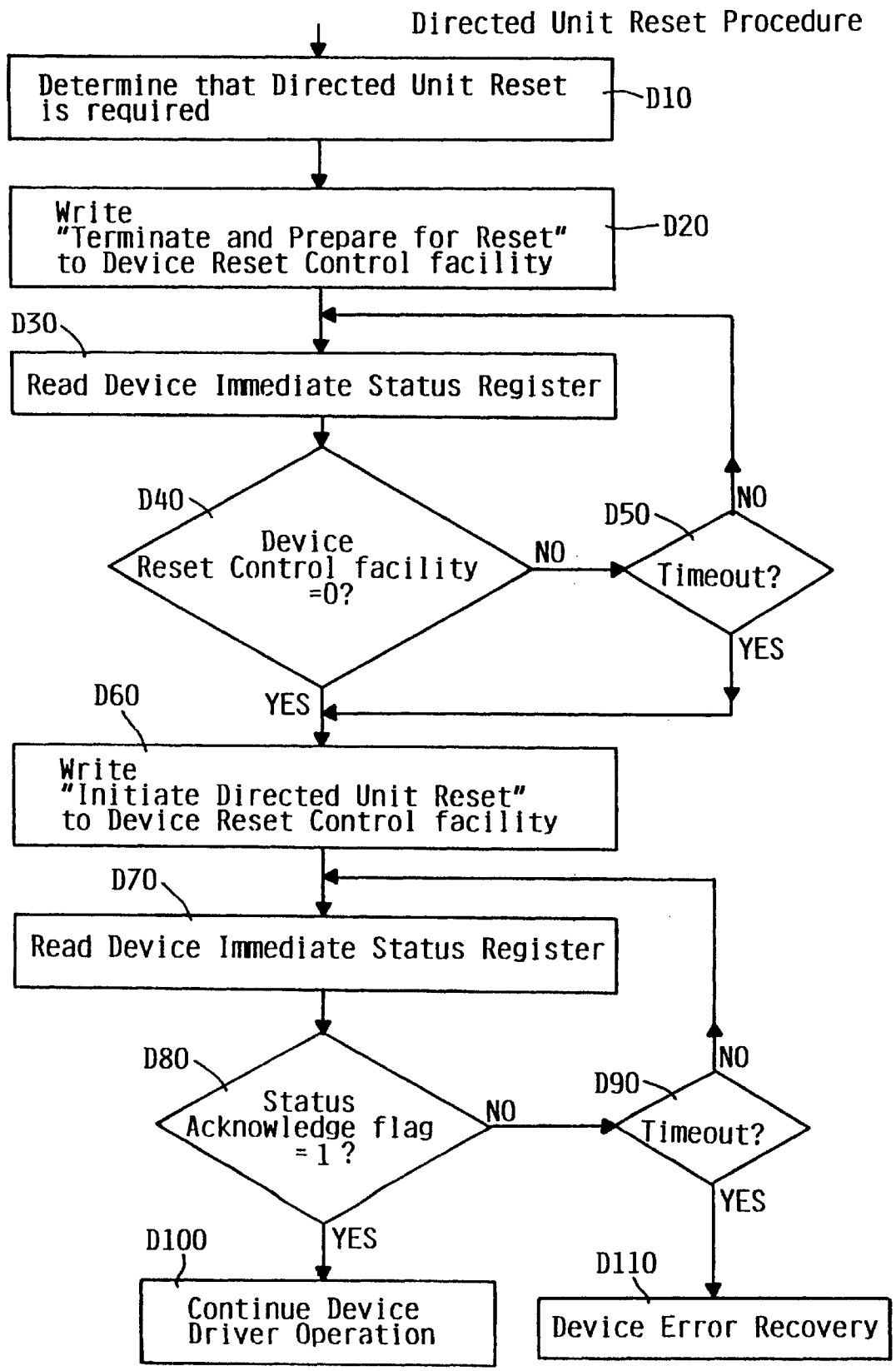
FIG. 7 illustrates a high-level flow chart of a directed unit reset process performed by an I/O device driver.

FIG. 7 illustrates the processing sequence executed by the I/O device driver 140 during directed unit reset procedure. This procedure begins with the I/O device driver 140 determining that a directed unit reset is required in step D10. The I/O device driver 140 may internally determine that a directed unit reset procedure is required or may receive a signal from another device that the directed unit reset procedure should be executed.

In step D20, the I/O device driver 140 writes a terminate and prepare for directed unit reset command to the device reset control register 460. This terminate and prepare for directed unit reset command includes writing a directed unit reset code to the reset type encode field 466. The terminate and prepare for directed unit reset command further includes setting bits in the operation termination controls 462 and reset controls 464 to terminate active or pending operations such as target memory operations, target I/O operations and master operations and otherwise prepare for the impending directed unit reset. Such preparations further include saving any volatile information into nonvolatile storage.

When the I/O device adapter 250 is ready for the directed unit reset, then the reset/testing decision logic 470 indicates this ready status in the reset controls 464 of the device reset control register 460.

The I/O device driver 140 then monitors the device reset control register 460 to determine if the I/O device adapter is ready for the directed unit reset. More specifically, the I/O device driver 140 executes steps D30 and D40 which read the device reset control register 460 and examine the reset controls 464 to determine if the I/O device adapter 250 is ready (e.g. device reset controls=0). Monitoring of the device reset control register 460 is only permitted for a certain period of time as indicated by timeout step D50; otherwise, the I/O device driver 140 may get trapped and wait indefinitely for the ready status to be indicated in the device reset control register 460.

After either steps D40 or D50, the I/O device driver then writes an initiate directed unit reset command to the device reset control register 460 which brings the single function device into the directed unit reset state.

The directed unit reset state includes the following semantics: preserve any information stored in volatile storage such as memory 260; disable the I/O device adapter 250 from participating in conventional target I/O operations, target memory operations and master operations; instruct the I/O device adapter 250 to perform nondestructive internal tests such as memory integrity tests, hardware integrity tests, etc.; and preserve all configuration states and information stored in built-in self-test control/status register 440, device immediate status register 450, device reset control register 460, and reset/testing decision logic 470. When the directed unit reset state has been achieved, the reset/decision logic 470 then sets the status acknowledge flag in the device immediate status register 450.

The I/O device driver 140 monitors the device immediate status register 450 to determine if the I/O device adapter has achieved the directed unit reset state. More specifically, the I/O device driver 140 repeatedly executes steps D70 and D80 which read the device immediate status register 450 and examine the contents thereof to determine if the I/O device adapter has achieved directed unit reset state (e.g. status acknowledge flag=1). Monitoring of the device immediate status register 450 is only permitted for a certain period of time as indicated by timeout step D90; otherwise, the I/O device driver 140 may get trapped and wait indefinitely for the ready status to be indicated in the device immediate status register 450.

If the directed unit reset state is achieved within the timeout period, then the I/O device driver 140 may continue with other device driver operations as indicated by step D100. Other-wise, a device error recovery process is executed in step D110 because the directed unit reset state should be achieved within the timeout period.

Directed Interface Reset

The preferred embodiment of the invention provides a third unique type of reset termed a directed interface reset. Unlike the conventional power-on reset loosely defined in the PCI local bus specification, the directed interface reset procedure is a selective reset procedure that brings a selected I/O device adapter into a well-defined directed interface reset state. The selectivity of the directed interface reset procedure forces a selected I/O device adapter to enter a directed interface reset state without affecting other I/O device adapters.

Figure 8:
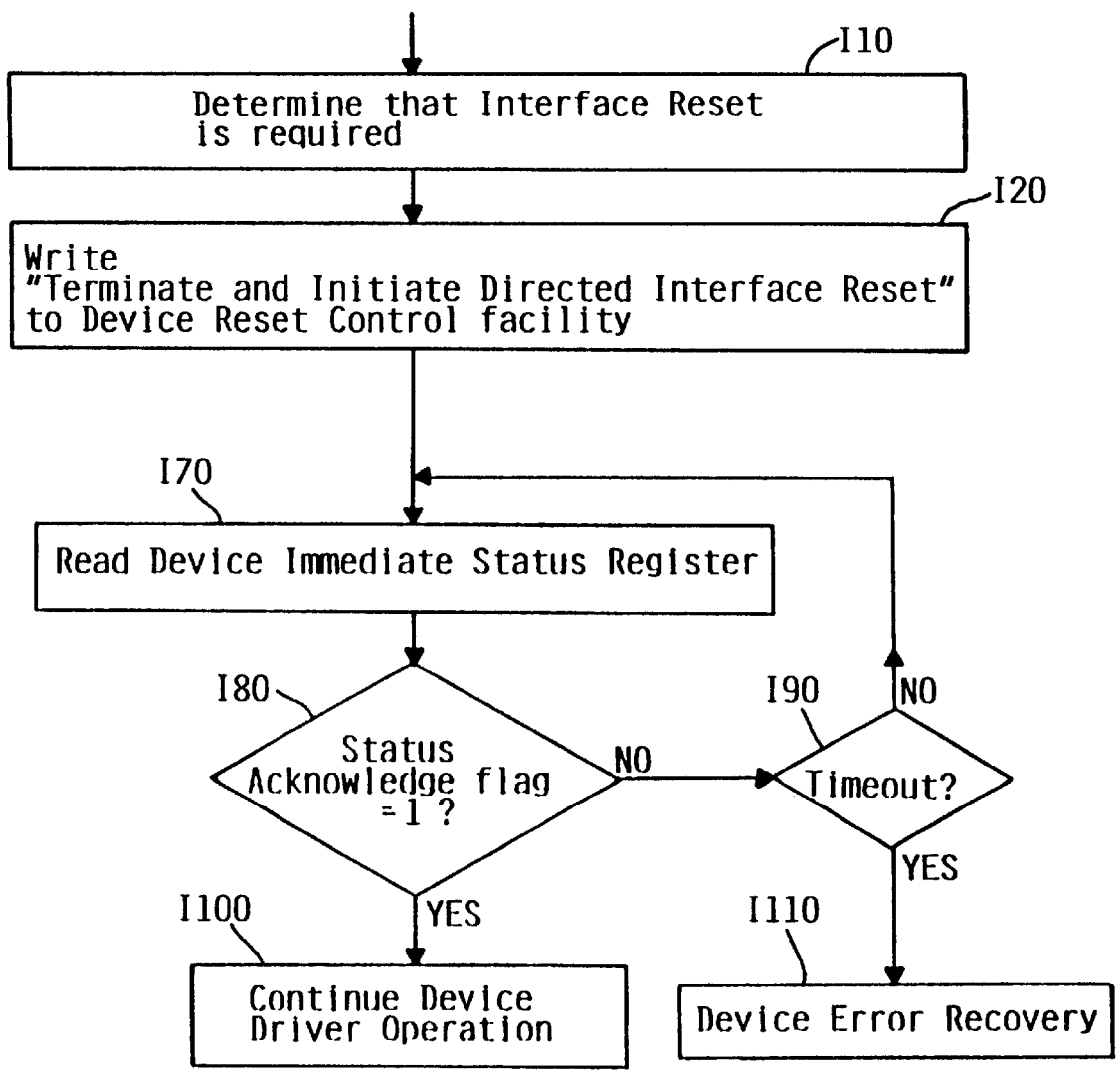
FIG. 8 illustrates a high-level flow chart of a directed interface reset process performed by an I/O device driver.

FIG. 8 illustrates the processing sequence executed by the I/O device driver 140 during directed interface reset procedure. This procedure begins with the I/O device driver 140 determining that a directed interface reset is required in step I10. The I/O device driver 140 may internally determine that a directed interface reset procedure is required or may receive a signal from another device that the directed interface reset procedure should be executed.

In step I20, the I/O device driver 140 writes a terminate and prepare for directed interface reset command to the device reset control register 460. This terminate and prepare for directed interface reset command includes writing a directed interface reset code to the reset type encode field 466. The terminate and prepare for directed interface reset command further includes setting bits in the operation termination controls 462 and reset controls 464 to terminate active or pending operations such as target memory operations, target I/O operations and master operations and otherwise prepare for the impending directed interface reset. Such preparations further include saving any volatile information into nonvolatile storage.

The directed interface reset does not alter any values stored in, for example, the memory device 260 or configuration space 255. Therefore, the directed interface reset procedure does not utilize the ready status signal in the reset controls 464 of the device reset control register 460. Thus, step I20 in the directed interface reset procedure proceeds directly to initiation of the directed interface reset by causing the I/O device driver 140 to write an initiate directed interface reset command to the device reset control register 460 which brings the single function device into the directed interface reset state.

The directed interface reset state includes the following semantics: preserve any information stored in volatile storage such as memory 260; disable the I/O device adapter 250 from participating in conventional target I/O operations, target memory operations and master operations; preserve all configuration states and information stored in built-in self-test control/status register 440, device immediate status register 450, device reset control register 460, and reset/testing decision logic 470; and reinitialize any operational facilities, such as flags, message queues, and message queue pointers, to a valid state to allow functional commands from the I/O device driver 140 to be issued and executed by the I/O adapter 250 and/or I/O device 280. When the directed interface reset state has been achieved, the reset/decision logic 470 then sets the status acknowledge flag in the device immediate status register 450 (e.g. status acknowledge flag set to one).

The I/O device driver 140 monitors the device immediate status register 450 to determine if the I/O device adapter has achieved the directed interface reset state. More specifically, the I/O device driver 140 repeatedly executes steps I70 and I80 which read the device immediate status register 450 and examine the contents thereof to determine if the I/O device adapter has achieved logical power on reset state (e.g. status acknowledge flag=1). Monitoring of the device immediate status register 450 is only permitted for a certain period of time as indicated by timeout step I90; otherwise, the I/O device driver 140 may get trapped and wait indefinitely for the ready status to be indicated in the device immediate status register 450.

If the directed interface reset state is achieved within the timeout period, then the I/O device driver 140 may continue with other device driver operations as indicated by step I100. Otherwise, a device error recovery process is executed in step I110 because the directed interface reset state should be achieved within the timeout period.

The differences between the logical power on reset state, the directed unit reset state and the directed interface reset state primarily revolve around the extend to which the I/O device adapter is reset. The logical power on reset state is a hard reset which effectively erases or clears volatile storage devices in the I/O device adapter and which performs a destructive test such as a built-in self-test that may erase or reconfigure the I/O device adapter. In contrast, the directed unit reset is primarily an error recovery reset that preserves volatile storage in the I/O device adapter, conducts non-destructive tests and brings the I/O device adapter 250 back into a well-defined functional state (directed unit reset state). The directed interface reset is the "softest" reset that preserves volatile storage in the I/O device adapter and brings the I/O device adapter 250 back into a well-defined functional state (directed interface reset state).

The above operation has been described in relation to a single-function device 245; however, the same processes may be utilized for the multifunction device 265 illustrated in FIG. 4(a). The differences in the reset processes are as follows. The single-function device 245 requires only a single copy of each of the registers 450 and 460, but the multifunction device 265 requires a copy of these registers 450 and 460 for each of the I/O device adapters 252, 254 connected thereto. The reset procedures are individually performed with respect to the multiple copies of the registers 450 and 460. In other words, the reset procedures are selective or directed to a particular I/O device adapter 252 or 254 within the multifunction device. Thus, only the copy of the registers 450 and 460 corresponding to the selected I/O device adapter is processed in the procedure illustrated in FIGS. 5–8 and described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer system for managing built-in self-tests, comprising:
   a processor complex having a central processing unit and a memory and at least one input/output device driver; and
   a multifunction input/output device connected to the processor complex on a bus, said multifunction input/output device having at least one input/output function and at least one input/output device adapter, said multifunction input/output device comprising:
      a built-in self-test status/control register having a built-in self-test capable field indicating whether any of the at least one input/output device adapter connected to the multifunction device is capable of performing a built-in self test;
   a start built-in self-test field set by the I/O device driver to indicate the start of built-in self-test across the multifunction device;
   a global completion code field to indicate that all of at least one input/output device adapter connected to the multifunction device has completed a built-in self-test; and
   a function completion code field to indicate a particular input/output function associate with the at least one device adapter connected to the multifunction device has completed a built-in self test.

2. A method of performing built-in self-test, comprising:
   (a) initiating a built-in self-test in a computer system comprising a central processing unit, a memory, at least one input/output device driver, a multifunction input/output device, a bus interconnecting the central processing unit, the memory, and the at least one input/output device driver to the multifunction input/output device;
   (b) determining if the multifunction input/output device or any of at least one attached function is capable of running the built-in self-test;
   (c) running the built-in self-test on the multifunction input/output device and the attached functions capable of running the built-in self-test independent of the built-in self-test on the multifunction input/output device and independent of any other attached functions capable of running the built-in self-test;
   (d) determining if the built-in self-test has completed in the multifunction input/output and all attached functions running the built-in self-test;
   (e) if the built-in self-test has completed, initializing all of the at least one functions; and
   (f) if the built-in self-test has not completed, isolating and recovering any errors of the multifunction device and any of the at least one attached function running the built-in self-test.

3. The method of claim 2, wherein the step of initiating a built-in self-test in a computer system further comprises the multifunction device receiving a power-on reset signal or a start built-in self-test signal, or a Peripheral computer Interface (PCI) reset signal.

4. The method of claim 2, wherein the step of determining if the multifunction input/output device or any of at least one attached function is capable of running the built-in self-test further comprises:
   the input/output device driver reading a function 0 and a built-in self-test capable field in a register in the multifunction device.

5. The method of claim 4, wherein the step of determining if the built-in self-test has completed in the multifunction input/output and all attached functions further comprises:
   the input/output device driver reading a start built-in self-test field and a global completion status field and a function completion status field in the register.

6. The method of claim 5, wherein the step of isolating and recovering any errors of the multifunction device and any of the at least one attached function further comprises:
   the input/output device driver detects that the built-in self-test has not completed after a predetermined time after the step of initializing.

7. A system for controlling a reset procedure of an I/O device adapter, comprising:
   a processor complex including a central processing unit and a memory connected thereto;
   a bus connecting said processor complex and said I/O device adapter;
   an I/O device driver provided in said processor complex;
   a device reset control register provided in said I/O device adapter; and
   a device immediate status register provided in said I/O device adapter,
   said I/O device driver determining that the reset procedure is required, then writing a terminate and prepare for reset command to said device reset control register,
   wherein after a reset event occurs said I/O device driver then writes an initiate reset command to said device reset control register triggering the I/O device adapter to initiate the reset procedure, said I/O adapter writing a status acknowledge code into said device immediate status register upon completion of the reset procedure, and said I/O device driver monitoring said device immediate status register to determine completion of the reset procedure as indicated by the status acknowledge code.

8. The system according to claim 7, said I/O device driver determining that the reset procedure is required by receiving a command from another device connected to said bus.

9. The system according to claim 7, said reset event including the expiration of a timeout period.

10. The system according to claim 7, said reset event including an indication stored in said device reset control register indicating that the terminate and prepare for reset command has been acknowledged by said I/O device adapter.

11. The system according to claim 7, further comprising:

reset decision logic connected to said device reset control register, said reset decision logic storing the indication in said device reset control register indicating that the terminate and prepare for reset command has been acknowledged by said I/O device adapter.

12. The system according to claim 7, said device reset control register including a reset type field, said I/O device driver determining a type of reset procedure, then writing a reset type code to said reset type field of said device reset control register.

13. The system according to claim 12, wherein the type of reset procedure is a logical power on reset procedure, said I/O device driver writing the reset type code indicating the logical power on reset procedure to the reset type field of said device reset control register, wherein the logical power on reset procedure places said I/O device adapter into a logical power on reset state.

14. The system according to claim 13, said logical power on reset state disabling said I/O device adapter from participating in target I/O operations, target memory operations and master operations, and said logical power on reset state terminating any active or pending operations to or from said I/O device adapter.

15. The system according to claim 13, said I/O device adapter including a memory device, said logical power on reset state erasing values stored in said memory device, said logical power on reset state bringing said memory device into an uninitialized state, and said logical power on reset state triggering a built-in self-test in said I/O device adapter.

16. The system according to claim 13, wherein said I/O device adapter is a multifunction I/O device adapter including a function routing/controlling facility having a plurality of I/O device adapters connected thereto, said bus connecting said processor complex and said function routing/controlling facility, said function routing/controlling facility transmitting data and/or control signals between said processor complex and at least one of said plurality of I/O device adapters via said bus, said logical power on reset state causing said multifunction I/O device adapter to send a power-on reset signal to each of said I/O device adapter connected to said function routing/controlling facility, and said logical power on reset state triggering a built-in self-test in each of said I/O device adapters.

17. The system according to claim 12, wherein the type of reset procedure is a directed unit reset procedure, said I/O device driver writing the reset type code indicating the directed unit reset procedure to the reset type field of said device reset control register, wherein the directed unit reset procedure places said I/O device adapter into a directed unit reset state.

18. The system according to claim 17, said directed unit reset state disabling said I/O device adapter from participating in target I/O operations, target memory operations and master operations, and said directed unit reset state terminating any active or pending operations to or from said I/O device adapter.

19. The system according to claim 17, said I/O device adapter including a memory device and a configuration space, said directed unit reset state preserving values stored in said configuration space, said device reset control register and said memory device, and said directed unit reset state causing said I/O device adapter to perform a limited set of tests that preserve critical information such as memory.

20. The system according to claim 12, wherein the type of reset procedure is an interface reset procedure, said I/O device driver writing the reset type code indicating the interface reset procedure to the reset type field of said device reset control register, wherein the interface reset procedure places said I/O device adapter into an interface reset state.

21. The system according to claim 20, said interface reset state disabling said I/O device adapter from participating in target I/O operations, target memory operations and master operations, and said interface reset state terminating any active or pending operations to or from said I/O device adapter.

22. The system according to claim 20, said I/O device adapter including a memory device and a configuration space, said interface unit reset state preserving values stored in said configuration space, said device reset control register and said memory device, and said interface reset state initializing said I/O device adapter to a valid state allowing commands from said I/O device driver to be performed.

23. A method of controlling a reset procedure of an I/O device adapter, comprising the steps of:

providing a device reset control register in the I/O device adapter;

providing a device immediate status register in the I/O device adapter;

determining that the reset procedure is required;

writing a terminate and prepare for reset command to the device reset control register;

wherein after a reset event occurs then writing an initiate reset command to the device reset control register triggering the I/O device adapter to initiate the reset procedure;

writing a status acknowledge code into the device immediate status register upon completion of the reset procedure; and monitoring the device immediate status register to determine completion of the reset procedure as indicated by the status acknowledge code.

24. The method according to claim 23, further comprising the step of:

determining that the reset procedure is required by receiving a command from another device.

25. The method according to claim 23, wherein the reset event includes the expiration of a timeout period.

26. The method according to claim 23, wherein the reset event includes storing an indication in the device reset control register indicating that the terminate and prepare for reset command has been acknowledged by said I/O device adapter.

27. The method according to claim 26, further comprising the steps of:

storing the indication in the device reset control register indicating that the terminate and prepare for reset command has been acknowledged by the I/O device adapter.

28. The method according to claim 23, further comprising the steps of:

providing the device reset control register with a reset type field;

determining a type of reset procedure; and writing a reset type code to the reset type field of the device reset control register.

29. The method according to claim 28, wherein the type of reset procedure is a logical power on reset procedure, said writing step writing the reset type code indicating the logical power on reset procedure to the reset type field of the device reset control register, wherein the logical power on reset procedure places said I/O device adapter into a logical power on reset state.

30. The method according to claim 29, the logical power on reset state disabling the I/O device adapter bom participating in target I/O operations, target memory operations and master operations, and the logical power on reset state terminating any active or pending operations to or from the I/O device adapter.

31. The system according to claim 29, further comprising the steps of:

providing the I/O device adapter with a memory, the logical power on reset state erasing values stored in the memory, the logical power on reset state bringing the memory into an uninitialized state, and the logical power on reset state triggering a built-in self-test in the I/O device adapter.

32. The method according to claim 31, the directed unit reset state disabling the I/O device adapter from participating in target I/O operations, target memory operations and master operations, and the directed unit reset state terminating any active or pending operations to or from the I/O device adapter.

33. The method according to claim 31, providing the I/O device adapter with a memory and a configuration space, the directed unit reset state preserving values stored in the configuration space, the device reset control register and the memory, and the directed unit reset state causing the I/O device adapter to perform a test.

34. The method according to claim 29, wherein the I/O device adapter is a multi-function I/O device adapter, providing the multi-function I/O device adapter with a function routing/controlling facility having a plurality of I/O device adapters connected thereto, the logical power on reset state causing said multi-function I/O device adapter to send a power-on reset signal to each of said I/O device adapters connected to the function routing/controlling facility, and the logical power on reset state triggering a built-in self-test in each of the I/O device adapters.

35. The method according to claim 28, wherein the type of reset procedure is a directed unit reset procedure, the method further comprising the steps of:

writing the reset type code indicating the directed unit reset procedure to the reset type field of the device reset control register, wherein the directed unit reset procedure places said I/O device adapter into a directed unit reset state.

36. The method according to claim 28, wherein the type of reset procedure is an interface reset procedure, the method further comprising the steps of:

writing the reset type code indicating the interface reset procedure to the reset type field of the device reset control register, wherein the interface reset procedure places said I/O device adapter into an interface reset state.

37. The method according to claim 36, the interface reset state disabling the I/O device adapter from participating in target I/O operations, target memory operations and master operations, and the interface reset state terminating any active or pending operations to or from the I/O device adapter.

38. The method according to claim 36, providing the I/O device adapter within a memory and a configuration space, the interface unit reset state preserving values stored in the configuration space, the device reset control register and the memory, and the interface reset state initializing the I/O device adapter to a valid state that allows commands to be performed by the I/O device adapter.

* * * * *